S. B. GOFF.
APPARATUS FOR MAKING BRIQUETS.
APPLICATION FILED SEPT. 11, 1913.
1,114,980.
Patented Oct. 27, 1914.
3 SHEETS—SHEET 1.
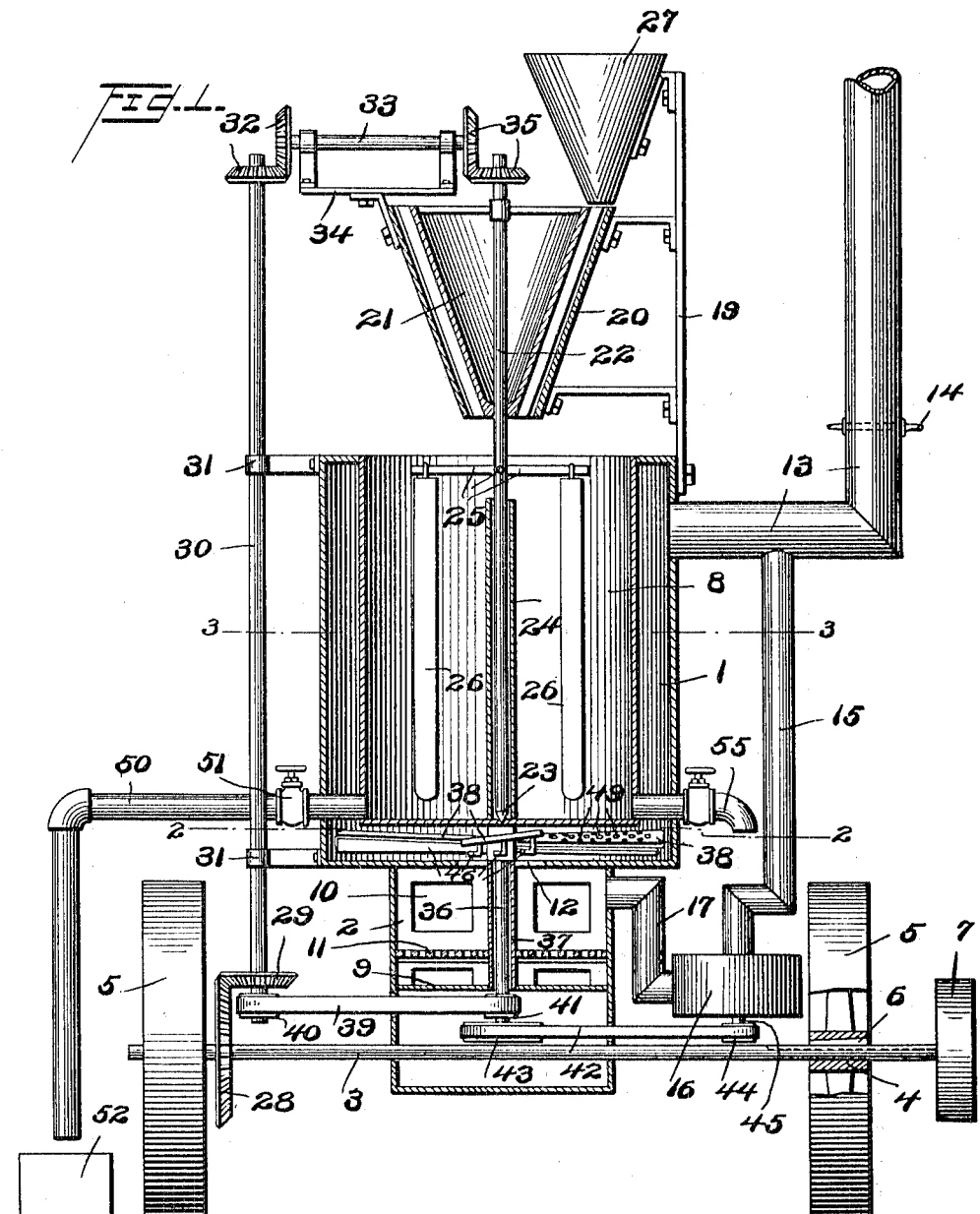
Witnesses
Harold S. Trauss
C. R. Ziegler.
Inventor
Samuel B. Goff
By Joshua R. H. Potts.
Attorney S. B. GOFF.
APPARATUS FOR MAKING BRIQUETS.
APPLICATION FILED SEPT. 11, 1913.
1,114,980.
Patented Oct. 27, 1914.
3 SHEETS—SHEET 2.
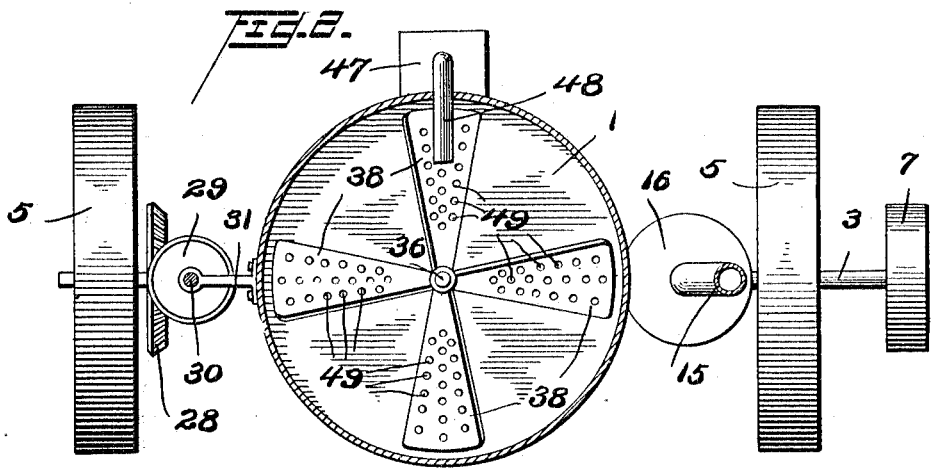
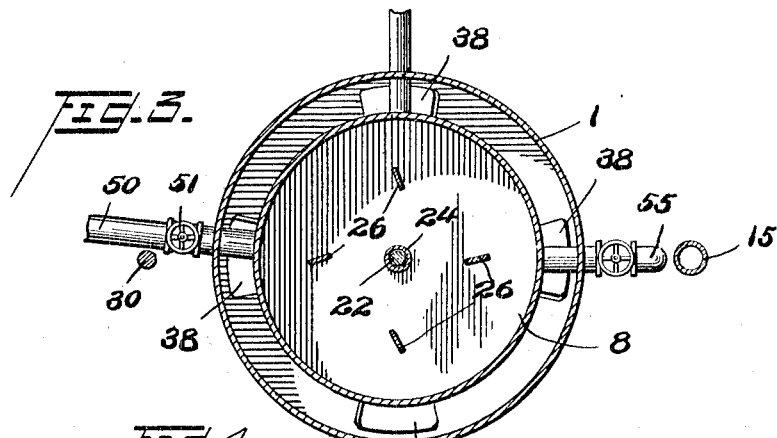
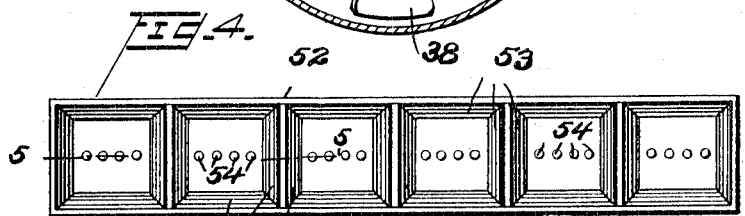
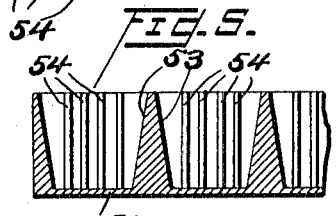
Witnesses
Harold Strans
C. R. Ziegler.
Inventor
Samuel B. Goff
By Joshua R. H. Potts.
Attorney S. B. GOFF.
APPARATUS FOR MAKING BRIQUETS.
APPLICATION FILED SEPT. 11, 1913.
1,114,980.
Patented Oct. 27, 1914.
3 SHEETS—SHEET 3.
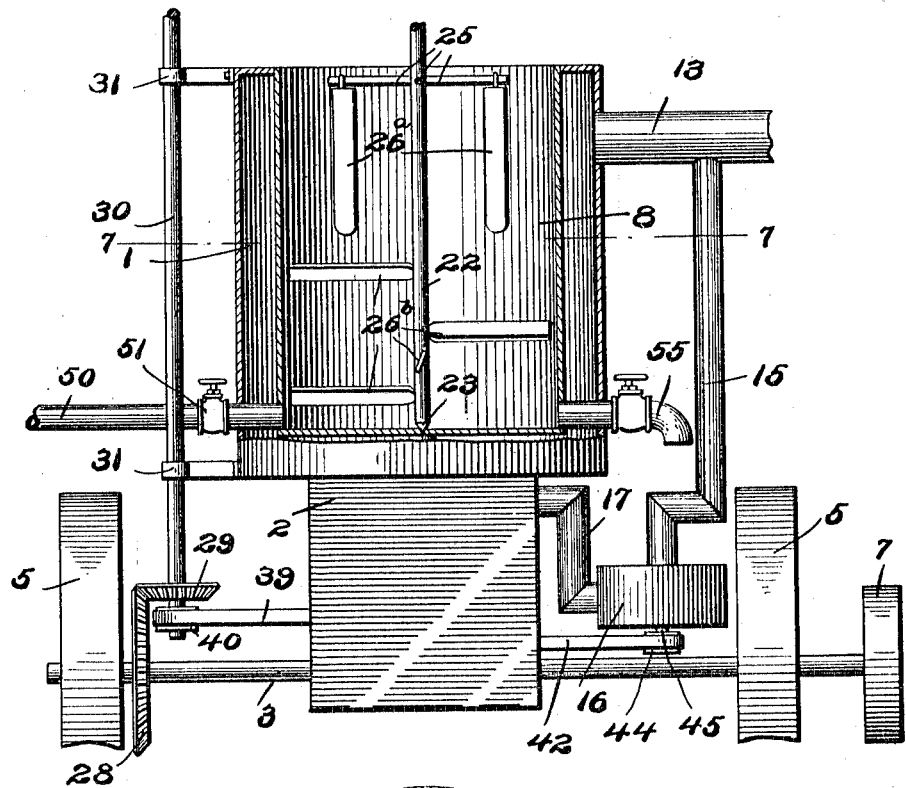
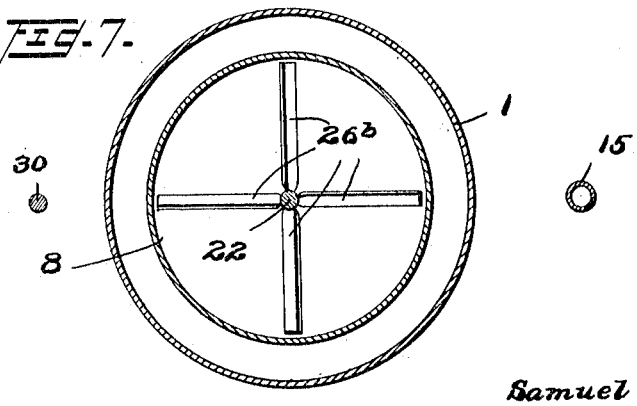
Witnesses
Harold Strauss
C. R. Ziegler.
Inventor
Samuel B. Goff
By Joshua R. H. Potts
Attorney

UNITED STATES PATENT OFFICE.

SAMUEL B. GOFF, OF CAMDEN, NEW JERSEY.

APPARATUS FOR MAKING BRIQUETS.

1,114,980.  Specification of Letters Patent.  Patented Oct. 27, 1914.

Application filed September 11, 1913. Serial No. 789,234.

*To all whom it may concern:*

Be it known that I, SAMUEL B. GOFF, a citizen of the United States, residing at Camden, in the county of Camden and State of New Jersey, have invented certain new and useful Improvements in Apparatus for Making Briquets, of which the following is a specification.

My invention relates to improvements in apparatus for making briquets, the object of the invention being to provide improved means for heating and mixing the ingredients for the briquets in an economical manner, and then discharging the material into molds for drying.

A further object is to provide improved means for crushing the composition before its passage into a receptacle in which it is agitated and heated with a view to bringing the material to a liquid state.

A further object is to provide improved means for catching and burning the soot which would otherwise pass off through the smoke pipe.

A further object is to provide improved means for returning to the fire box, the smoke and gases for consumption.

A further object is to provide improved molds for briquets which will provide in the briquets, a plurality of openings to facilitate the burning thereof.

With these and other objects in view, the invention consists in certain novel features of construction and combinations and arrangements of parts as will be more fully hereinafter described and pointed out in the claims.

In the accompanying drawings: Figure 1 is a view in vertical section illustrating my improvements. Fig. 2 is a view in cross section on the line 2—2 of Fig. 1. Fig. 3 is a view in cross section on the line 3—3 of Fig. 1. Fig. 4 is a plan view of the briquet mold. Fig. 5 is a fragmentary view in section on the line 5—5 of Fig. 4. Fig. 6 is a fragmentary view in vertical section illustrating a modification, and Fig. 7 is a view in cross section on the line 7—7 of Fig. 6.

1 represents a cylinder supported upon a casing 2, the latter mounted on an axle 3. The axle 3 is supported in the hubs 4 of traction wheels 5, and said hubs have keys 6 which lock the wheels to the axle and may be removed whenever desired, so that the axle may be turned by a pulley 7 as clearly shown.

Within the cylinder 1, a mixing tank 8 is located and spaced from the cylinder at its sides as well as at its lower end. The casing 2 is divided by a partition 9 into an upper compartment forming a fire chamber 10 with a grate 11 therein. The smoke and gases from this fire chamber pass upwardly through an opening 12 in the bottom of cylinder 1, thence around the outside of tank 8 into a chimney 13. The chimney 13 has a damper 14 therein, and between the damper 14 and the cylinder 1, a return pipe 15 is connected. This pipe 15 communicates with a fan casing 16, the latter having a discharge pipe 17 for directing the smoke and gases back into the fire box.

A frame 19 secured to cylinder 1, supports a conical grinder or mill 20, the conical rotary member 21 thereof being secured to a vertical shaft 22 which extends into tank 8, and has a thrust bearing at its lower end as shown at 23. A tube 24 is located in the center of tank 8, and houses the shaft 22. Radial arms 25 are fixed to shaft 22 and support agitators or beaters 26 which stir the material in the tank. A hopper 27 is supported by the frame 19 and directs the material to be treated into the mill 20.

A beveled gear 28 on axle 3 meshes with a beveled pinion 29 on a vertical shaft 30. This shaft 30 is supported in suitable bearings 31 on cylinder 1, and at its upper ends is connected by beveled gears 32 with a horizontal shaft 33. This shaft 33 is supported in a bracket 34 fixed to the mill 20, and at its inner end is connected by beveled gears 35 with the shaft 22.

A vertical shaft 36 projects up through a tube 37 in the fire box, and is provided on its upper end in cylinder 1 between the lower end of the cylinder, and the lower end of the tank 8, with a series of radial blades 38 for a purpose which will hereinafter appear. A belt 39 connects a pulley 40 on shaft 30 with a pulley 41 on shaft 36. A belt 42 connects a pulley 43 on shaft 36 with a pulley 44 on the fan shaft 45, so that it will be observed that the turning of the axle 3 will cause rotary motion to be imparted to the several shafts above referred to. The blades 38 constitute a soot catcher, and they lie in the path of the smoke and gases from the fire box to the chimney 13. The blades 38 are provided on their lower faces with angle bars 46 which catch the soot and the consumption of this soot is facilitated by the provision of means for supplying a combustible liquid to the blades. I have illustrated for this purpose, a tank 47 on the outside of cylinder 1 which is provided with a pipe 48 projecting into the cylinder and designed to drip upon the blades.

The blades are perforated as shown at 49, so that combustible material may find its way through the blades and readily burn the soot. On one side of the apparatus, and communicating with the lower end of tank 8, is a discharge pipe 50 having a valve 51 therein. This pipe 50 is adapted to discharge the composition into a series of molds 52 located on the ground or at some convenient point. These molds 52 have inclined walls 53 to allow the briquets when dried to readily fall out of the molds. Each of the molds is provided with pins 54 which leave holes in the briquets, hence allowing a free draft through the briquets and facilitating their consumption in the fire box. A faucet 55 is also provided on the tank 8, so that the contents of the tank may be drawn off through this faucet whenever desired.

In the modification illustrated in Figs. 6 and 7, the shaft 22 not only supports vertical beaters or stirrers 26ª which are appreciably shorter than the beaters 26, but also provides a circular series of horizontally positioned agitators or beaters 26ᵇ. These horizontal agitators or beaters not only cause the material to thoroughly mix, but exert a certain amount of pressure or force back of the material to compel it to flow out through the outlets. To facilitate this, it will be observed that the beaters are at an angle.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an apparatus of the character described, the combination with a cylinder, a tank in the cylinder and smaller than the cylinder, a fire box below the cylinder and communicating therewith, a soot catcher located between the bottom of the tank and the bottom of the cylinder, a chimney communicating with the cylinder, and means for returning the smoke from the chimney to the fire box, substantially as described.

2. In an apparatus of the character described, the combination with an axle, wheels supporting the axle, a fire box supported on the axle, a tank supported on the fire box, and around which the smoke and gases from the fire box are directed, a soot catcher located below the tank and above the fire box, an agitator in the tank, means for transmitting motion from the axle to the agitator, and a valved outlet communicating with said tank, substantially as described.

3. In an apparatus of the character described, the combination with an axle, wheels supporting the axle, a fire box supported on the axle, a tank supported on the fire box, and around which the smoke and gases from the fire box are directed, an agitator in the tank, means for transmitting motion from the axle to the agitator, a rotary soot catcher located between the lower end of the tank and the fire box, and means for turning said soot catcher, substantially as described.

4. In an apparatus of the character described, the combination with an axle, wheels supporting the axle, a fire box supported on the axle, a tank supported on the fire box, and around which the smoke and gases form the fire box are directed, an agitator in the tank, means for transmitting motion from the axle to the agitator, a tube projecting through the fire box, a shaft in said tube, a soot catcher on the upper end of said shaft comprising a plurality of blades, and means for turning said shaft, substantially as described.

5. In an apparatus of the character described, the combination with an axle, wheels supporting the axle, a fire box supported on the axle, a tank supported on the fire box, and around which the smoke and gases from the fire box are directed, an agitator in the tank, means for transmitting motion from the axle to the agitator, a tube projecting through the fire box, a shaft in said tube, a soot catcher on the upper end of said shaft comprising a plurality of blades, means for turning said shaft, and said blades having angle bars on their lower faces, substantially as described.

6. In an apparatus of the character described, the combination with an axle, wheels supporting the axle, a fire box supported on the axle, a tank supported on the fire box, and around which the smoke and gases from the fire box are directed, an agitator in the tank, means for transmitting motion from the axle to the agitator, a tube projecting through the fire box, a shaft in said tube, a soot catcher on the upper end of said shaft comprising a plurality of blades, means for turning said shaft, said blades having angle bars on their lower faces, said blades having perforations therein, and means for directing a combustible material onto said blades, substantially as described.

7. The combination with a wheel supported tank, of a fire box below the tank and adapted to heat the same, of a mill supported above the tank, an agitator in the tank, means for simultaneously operating the mill and the agitator, a discharge pipe communicating with the tank, and a valve in said pipe, substantially as described.

8. In an apparatus of the character described, the combination with a tank, means for heating the contents of the tank, an outlet pipe communicating with the tank adjacent the bottom, a vertical shaft in the tank, radial arms projecting from the shaft in the upper end of the tank, and vertically positioned beaters depending from said arms and located in a circular series around the inside of the tank with their lower ends spaced from the bottom of the tank, substantially as described.

In testimony whereof I have signed my name to this specification in the presence of two subscribing witnesses.

SAMUEL B. GOFF.

Witnesses:
M. E. DITTUS,
CHAS. E. POTTS.

Copies of this patent may be obtained for five cents each, by addressing the "Commissioner of Patents, Washington, D. C."